United States Patent [19]
Moore

[11] Patent Number: 5,253,996
[45] Date of Patent: Oct. 19, 1993

[54] APPARATUS FOR MANUFACTURING CONTAINERS WITH THICKENED FLANGES

[75] Inventor: Richard L. Moore, Fairhope, Ala.

[73] Assignee: The Lerio Corporation, Mobile, Ala.

[21] Appl. No.: 792,930

[22] Filed: Nov. 15, 1991

[51] Int. Cl.⁵ .......................... B29C 49/20
[52] U.S. Cl. ...................... 425/525; 264/531
[58] Field of Search ......... 425/525, 528; 264/531, 264/533, 527; 215/1 C; 65/261, 262

[56] References Cited

U.S. PATENT DOCUMENTS

| | | | |
|---|---|---|---|
| 2,977,633 | 4/1961 | Breitenstein | 264/531 |
| 3,179,508 | 4/1965 | Stapel | 425/525 X |
| 3,843,005 | 10/1974 | Uhlig | 215/1 C |
| 4,117,062 | 9/1978 | Uhlig | 425/525 X |
| 4,170,622 | 10/1979 | Uhlig | 264/520 |
| 4,170,623 | 10/1979 | Dubois et al. | 264/534 |
| 4,177,934 | 12/1979 | Hammes et al. | 220/319 |
| 4,378,328 | 3/1983 | Przytulla et al. | 264/534 |
| 4,409,176 | 10/1983 | Jakobsen et al. | 264/527 |
| 4,495,135 | 1/1985 | White | 264/553 |
| 4,529,570 | 7/1985 | Przytulla | 264/534 |
| 4,640,855 | 2/1987 | St. Clair | 215/1 C X |
| 4,650,627 | 3/1987 | Peters | 264/529 |
| 4,713,207 | 12/1987 | Udell et al. | 264/515 |
| 4,761,130 | 8/1988 | Peters | 425/532 |
| 4,769,206 | 9/1988 | Reymann et al. | 264/534 |
| 4,842,802 | 6/1989 | Przytulla | 264/530 |
| 4,938,680 | 7/1990 | Guarriello et al. | 425/525 X |
| 4,972,963 | 11/1990 | Guariello et al. | 215/1 C X |
| 5,026,268 | 6/1991 | Lee | 425/525 |
| 5,035,604 | 7/1991 | Rathman et al. | 425/525 |
| 5,044,923 | 9/1991 | Przytulla | 425/525 |
| 5,051,084 | 9/1991 | Guariello et al. | 425/525 |

FOREIGN PATENT DOCUMENTS 49-45797  12/1974  Japan ................. 425/525

Primary Examiner—Richard L. Chiesa
Attorney, Agent, or Firm—Roylance, Abrams, Berdo & Goodman

[57] ABSTRACT

An apparatus for producing blow-molded containers having thickened flanges. The apparatus utilizes major mold halves and a plurality of minor mold components disposed within the mold halves to form containers having thickened flanges. The minor mold components allows formation of flanges which are turned down relative to the longitudinal axis of the container. By allowing the mold halves to remain substantially still during the blow-molding process, the tab of material formed at the junction of the mold halves opposite to the feed end of the blow-molding chamber is preserved, thereby facilitating post-processing handling of the container. The thickened flange is formed by pressing together and fusing two layers of blow-molded material. The two layers of the thickened flange may enclose void space, thereby reducing the weight and manufacturing cost of the containers.

10 Claims, 4 Drawing Sheets

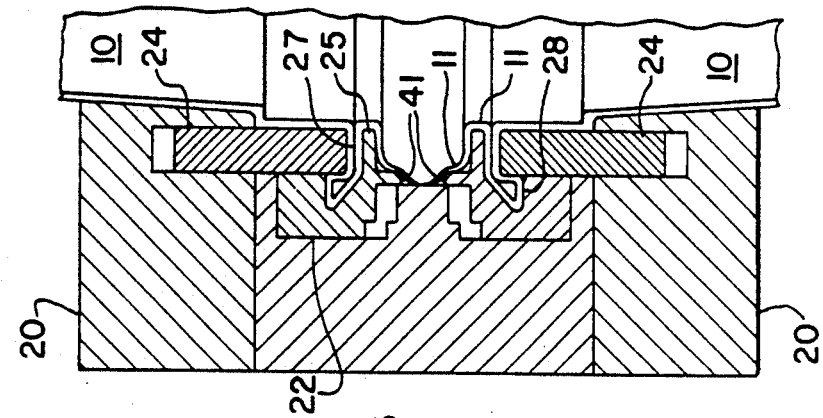
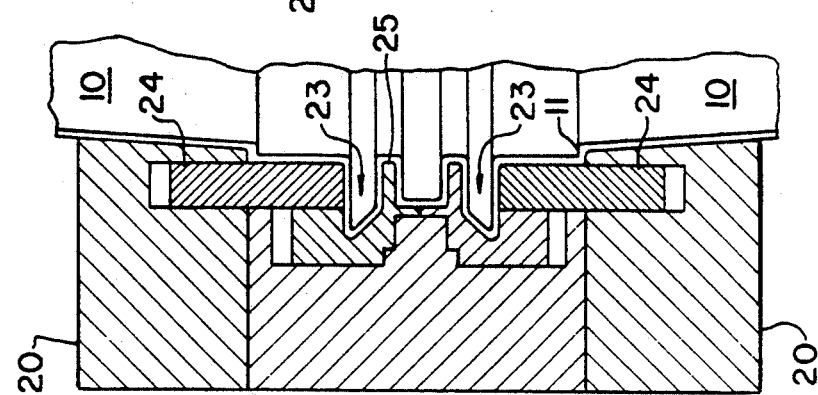
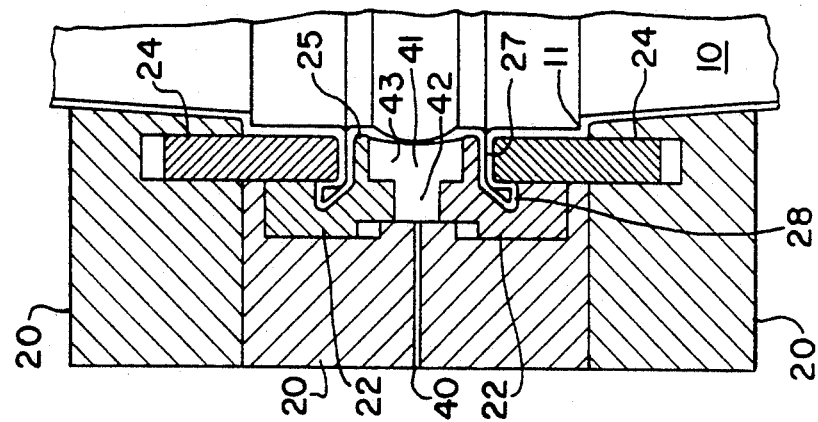
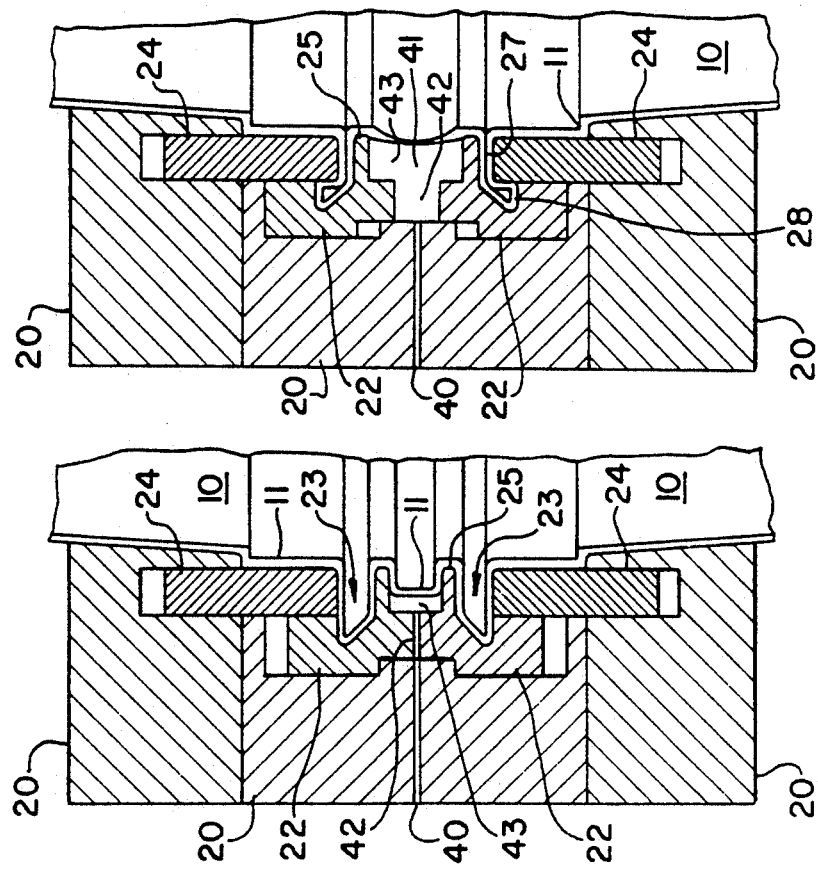

APPARATUS FOR MANUFACTURING CONTAINERS WITH THICKENED FLANGES

BACKGROUND OF THE INVENTION (a) Field of the Invention

The present invention relates, in general, to the formation of containers having a thickened flange. More specifically, the present invention discloses a process and apparatus for manufacturing blow-molded containers having thickened flanges. Containers produced by the inventive process and apparatus are also disclosed.

(b) Description of Related Art

Typically, blow-molding processes call for suspension of a heated tube or parison of thermoplastic material between two mold halves. The mold halves are closed on the suspended parison, then an expanding medium (e.g., air) at super atmospheric pressure is introduced into the tube. Alternatively, the mold may be evacuated, i.e., via vacuum, or both blow-molding pressure and vacuum may be combined so that the material of the tube eventually conforms to the contour of the mold. The mold is generally much cooler than the thermoplastic material, and hence, the thermoplastic material becomes rigid or "sets" after being in contact with the mold for a short period of time. Once the thermoplastic material sets, the mold halves are opened and the part is removed.

Owing to the particular qualities of previously-known blow-molding process, the open top containers produced thereby have not possessed a very rigid rim or top section. This has been particularly true with those containers with continually outwardly and upwardly tapering side walls wherein the top or rim constitutes the largest part of the container. In order to augment the strength of the top rim, conventional containers have been formed having an annular projection at the top thereof; the projection having a generally channel-shaped or multiple channel shaped cross section. This channel shaped cross section, although beneficial, often does not provide the rigidity required in many applications. Furthermore, the channel shaped section is located at the largest radial dimension of the mold where parison stretch is the greatest. For example, U.S. Pat. No. 4,972,963 to Guarriello et al. discloses a blow-molded article with a reverse lip. As shown in FIG. 3, the "reversed lip" refers to a generally U-shaped member which, by its shape, provides somewhat increased strength to the top of the container. The reversed lip has the same thickness as the rest of the container, however, i.e., one layer of blow-molded material.

In order to provide flanges having strength beyond the limits possible with a single thickness of blow-molded material, a variety of methods for producing thickened flanges have been developed. For example, in U.S. Pat. No. 4,713,207 to Udell et al. a process for producing blow-molded containers (e.g., drums) having thickened flanges and/or chimes is disclosed. The process calls for a ring of extrudate (E) to be placed in the mold before the parison (P) is extruded into the mold chamber. In this way, as the parison is blow molded, the extrudate (E) and parison (P) materials may bond together.

Placing two different materials within the mold chamber is time consuming and expensive, however. Therefore, other processes have been developed which form a thickened flange from a single parison of material. For example, U.S. Pat. No. 4,117,062 to Uhlig discloses a process for producing containers (e.g., drums) having thickened chimes and/or flanges. In this process, the mold chamber is configured to keep certain parts of the blow-molded container warmer than others (i.e., those sections which will be refolded). After the parison of thermoplastic material has been expanded, the desired portions of material are refolded to form flanges/chimes by axially moving the ring (26) (see, FIGS. 3-7). It does not appear that the layers of blow-molded material bond together after being folded over, however, and the simultaneous formation of two containers is not disclosed.

In other processes, the folded over layers of blow-molded material are substantially fused together, thereby increasing the strength of the flange. For example, in U.S. Pat. No. 3,843,005 to Uhlig (which is hereby incorporated by reference), the folded over layers may be bonded together by residual heat (see, e.g., column 11, lines 33-37). In this process (as is common in the prior art), however, the thickened flange (e.g., bottom support wall (99) in FIG. 3) is formed by moving one major mold section relative to another (e.g., plates (84) in FIGS. 15-17) in an axial direction, thereby moving a substantial portion of the mold and container. Since the molds are often quite heavy, this movement can be energy-intensive and wasteful. Furthermore, as shown in FIGS. 15-17, moving the major mold components often severs the "tail" (85) of thermoplastic material pinched between the mold sections. Severing the tail (85) is detrimental since this makes it more difficult to handle the container after it is released from the mold without marring the container.

Other processes have been developed wherein thickened flanges are formed by the movement of major mold sections. For example, U.S. Pat. No. 4,177,934 to Hammes et al. (which is hereby incorporated by reference) discloses a process for producing containers having a thickened flange wherein the folded over blow-molded material bonds to itself to form an integral flange (3). The flange (3) is formed by the axial movement of mold elements (10 and 11).

Finally, U.S. Pat. No. 5,026,268 to Lee discloses an apparatus for forming blow-molded containers having thickened flanges by folding over the thermoplastic material. The blow-molded material is folded over by the relative motion of three longitudinally-arranged major mold sections (36, 38, 40).

While these methods are capable of producing very useful containers, the problem of producing blow-molded containers having thickened flanges, the layers of which reliably bond together, without relying upon movement of major mold sections has remained. Furthermore the corollary problem of post-release (i.e., from the mold chamber) handling of the container also remains unsolved, i.e., in light of the tendency of present processes to remove the "tail" of extruded thermoplastic material pinched between the mold sections.

SUMMARY OF THE INVENTION

The inventive process and apparatus solve the problems and suboptimizations of the prior art by producing an open-top container which has a body portion, a radially outwardly extending flange disposed at the top of, and integral with, the body portion and an axially downwardly extending flange integral with and at the outer periphery of the radial flange. The containers are blow-molded two per mold in a mold which has at least one major or fixed mold element and at least four movable/minor internal mold elements. The fixed mold element provides two chambers which substantially conform to the body and bottom of each container. The movable mold elements together define annular recesses in the mold, one per container, in which an intermediate portion is formed during the blow-molding operation. Each annular recess has two radially outwardly extending sections, the upper section of which may be shorter than the lower section (or vice versa) and the ends of the radial sections being connected by an angular section. After the plastic material has conformed to the mold, but while it is still flowable, the center-most movable mold elements move axially apart and toward the other movable elements, causing the radial sections of the intermediate portion of each container to press together, forming a thickened radial flange with an integral axial flange at the extremity thereof. The axial flange may be downwardly oriented relative to the radial flange.

Compressed air may be introduced into the void created by the center-most movable mold elements to equalize the pressure in the void with the pressure within the containers. The thermoplastic material between the center-most movable elements is stretched, and therefore, becomes thin in the area of part separation, thus facilitating separation of the two containers and minimizing the amount of scrap. Once the molding operation is complete and the plastic is no longer flowable, the outer-most movable elements move axially away from the center-most movable elements to allow the container to be released from the mold.

Since only small internal mold elements move during formation of the thickened flange, the tail or pinch tab formed by the closing of the mold sections on the parison of thermoplastic material (i.e., at the bottom of the container) remains connected to the containers during production of the flanges. The pinch tab provides a convenient means for automated part (i.e., container) removal from the molding machine (e.g., by mechanical fingers grasping the tab prior to the mold opening, and then removing the containers after the mold has opened) for placement in a secondary trim machinery. Prevention of premature separation of the tab by the motion of the major mold elements is very helpful in facilitating part removal and subsequent automated handling. Furthermore, by requiring only the minor internal mold elements to move during the process of forming the thickened flanges, the present invention requires less energy than previous-known processes/apparatuses.

BRIEF DESCRIPTION OF THE DRAWINGS

For purposes of illustrating the invention, there is shown in the drawings a preferred form of the present apparatus, process and resultant article of manufacture. It is to be understood, however, that the invention is not limited to the precise arrangements and instrumentalities shown.

FIG. 8 is a fragmentary sectional view of the major and minor mold elements and the blow-molded material pursuant to an alternate embodiment of the invention wherein at least one air passage is provided between the first pair of minor mold elements when they are in the initial or closed position whereby the blow-molded material may be prevented from completely filling the annular recesses encompassed by the radial projections of the first pair of minor mold elements;

FIG. 9 is a fragmentary sectional view of the major and minor mold elements and the blow-molded material (as per the alternate embodiment of FIG. 8) in a second stage of the process;

FIG. 10 is a fragmentary sectional view of the major and minor mold elements and the blow-molded material pursuant to a second alternate embodiment of the invention wherein the size of the void created when the first pair of minor mold elements moves apart is limited, thereby allowing for the elimination of provisions for introducing pressurized gas therebetween; and FIG. 11 is a fragmentary sections view of the major and minor mold elements and the blow-molded material (as per the second alternate embodiment of FIG. 10) in a second stage of the process.

DETAILED DESCRIPTION OF THE PREFERRED EMBODIMENT

Figure 7:
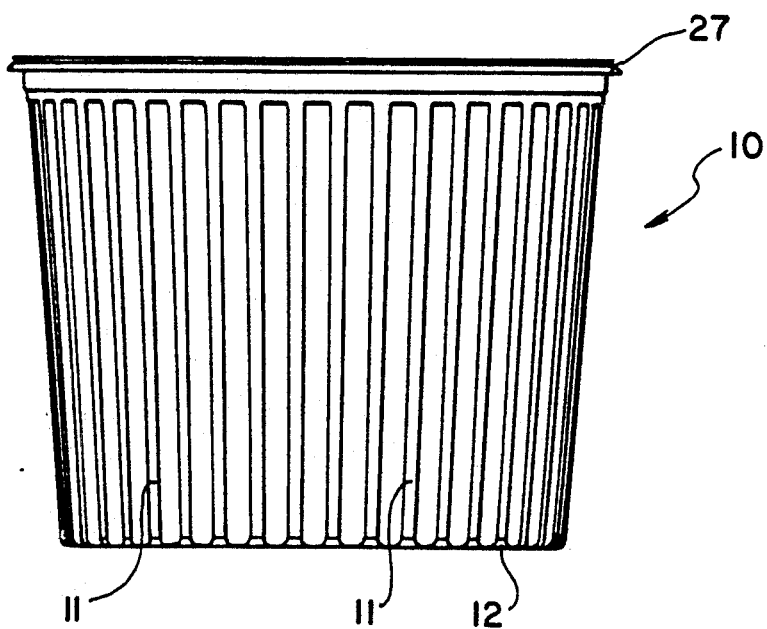
FIG. 7 is a side view of a container made by the inventive process and apparatus.

Referring to the drawings, wherein like numerals refer to like elements throughout, there is shown in FIG. 7 a container 10 made by the present process and apparatus. The container 10 may be formed from any suitable thermoplastic or thermosetting material (e.g., polypropylene, polyethylene, etc.) and may be formed in any suitable general configuration (e.g., round, square, etc.). To facilitate recycling of scrap material, thermoplastic materials (e.g., round, square, etc.). To facilitate recycling of scrap material, thermoplastic materials (e.g., high-density polyethylene) are preferably used. The container 10 may also be formed in a wide variety of sizes, e.g., from flower pots having a top opening of two inches square to containers for trees capable of holding several cubic yards of soil and plant material. As shown in FIG. 7, the container 10 may advantageous be formed to include ribs 11 for strengthening the container's 10 sidewall and a raised bottom 12 to facilitate water drainage from the container 10. In the case of flower pots, it is also helpful to put holes in the bottom of the container 10 to facilitate drainage of excess water.

(a) Apparatus

Figure 5:
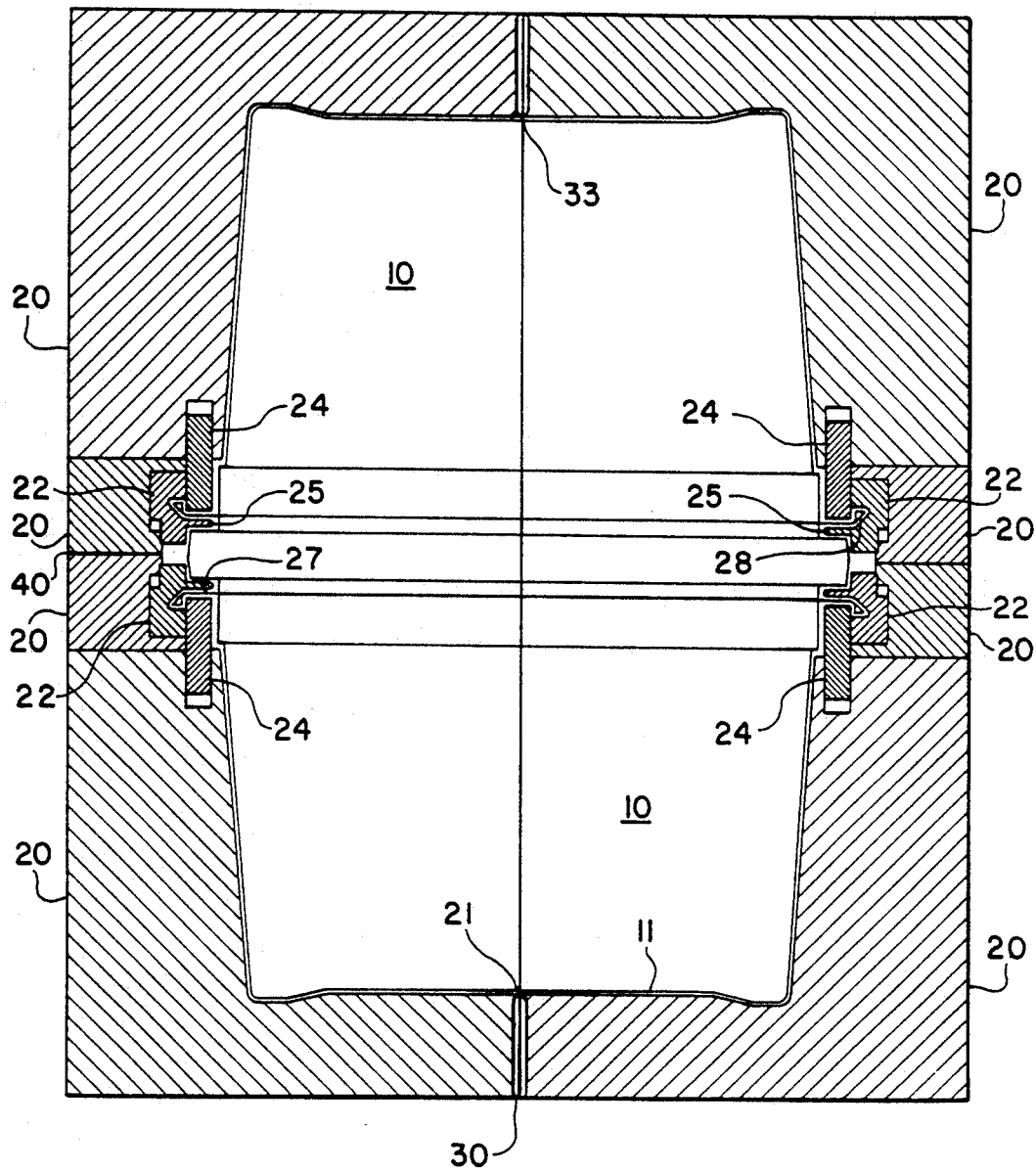
FIG. 5 is a sectional view of a pair of containers within the mold halves (as per the second step of the inventive process—FIG. 2) showing the minor movable mold elements and the tail of residual thermoplastic material formed by the pinching together of the major mold elements.

The apparatus used to produce the inventive containers 10 is similar to previously-known blow-molding apparatuses (see, e.g., U.S. Pat. No. 4,713,207 to Udell et al., which is hereby incorporated by reference) in that major mold sections 20 close around a parison of flowable thermoplastic material. As seen in FIG. 5, as the major mold sections close around the thermoplastic material, they create an enclosed mold chamber and pinch a residual "tail" of thermoplastic material 30 between the major mold sections 20 at the junction point 21 thereof. This "tail" of material facilitates post-processing removal of the containers 10 from the mold chamber and allows the molded containers to be handled without marring the sides thereof.

The major mold sections 20 help to cool and "set" the thermoplastic material after it is brought into contact with them (i.e., by blow-molding, vacuum, or a combination thereof). Therefore, the major mold sections 20 are preferably made of highly heat-conductive material, e.g., aluminum. More preferably, the major mold sections 20 include internal tubing (or bored, drilled, or otherwise fabricated passages) for conveying cold water (or other fluids, e.g., glycol) therethrough to further facilitate the cooling process. As noted above, the major mold sections 20 are preferably separable along a longitudinal (relative to the containers being formed therein) axis, thereby being openable to allow a parison of thermoplastic material to descend therebetween (e.g., from an extruder or other suitable means for producing moldable thermoplastic material as known in the art), and being closable to produce the tail of material 30 between the major mold sections 20 (i.e., at junction 21 thereof). The major mold sections 20 may also be openable along a latitudinal plane (relative to the containers being formed in the mold chamber), i.e., at the dividing point between the two containers 20 formed per process cycle of the apparatus. Latitudinally-divisible major mold sections 20 help to facilitate assembly, maintenance, shipping, etc. of the inventive apparatus (since the individual components can thereby be made smaller). Preferably, however, the major mold sections 20 will not be latitudinally-divisible during processing.

Figure 3:
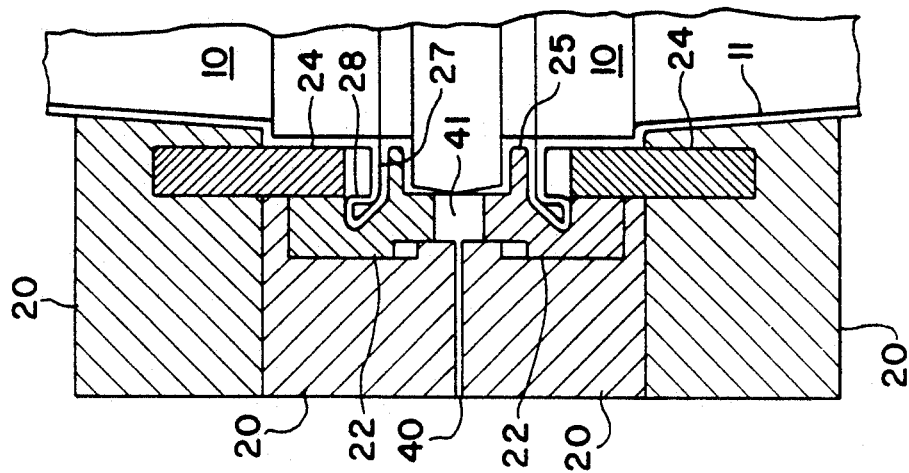
FIG. 3 is a fragmentary sectional view of the major and minor mold elements and the blow-molded material at the end of the process, as the part is ready to be released.
Figure 2:
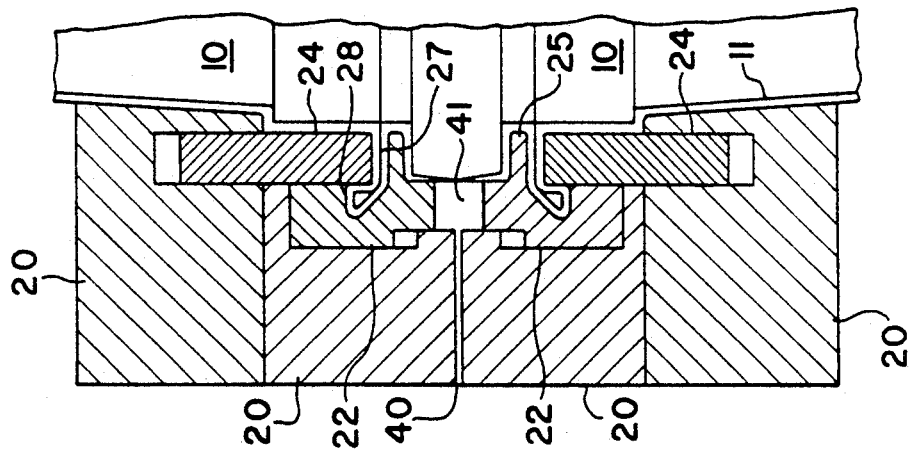
FIG. 2 is a fragmentary sectional view of major and minor mold elements and the blow-molded material at a second stage of the process.
Figure 1:
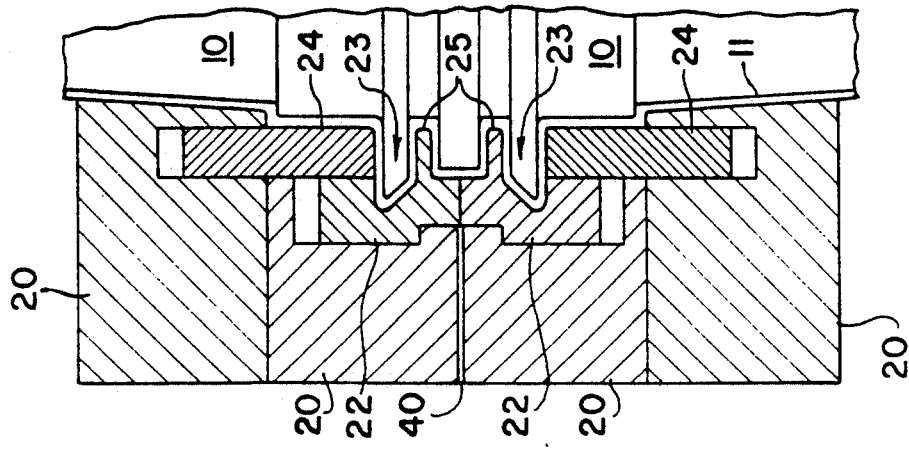
FIG. 1 is a fragmentary section view of the major and minor mold elements of the apparatus and of the blow-molded material associated therewith in the initial stage of the flange-thickening process.

To facilitate assembly, maintenance and/or processing, it may be advantageous to utilize different specific numbers of major mold sections 20 to enclose the mold chamber. For example, as shown in FIG. 5, it may be advantageous to use six major mold sections 20 (a pair of longitudinally-divisible central major mold sections holding the first pair of minor mold sections 22—22 and including an air passageway 40; and two pairs of peripheral longitudinally-divisible major mold sections—holding the second pair of minor mold sections 24—24 and trapping the tail 30 of material). The important consideration is that the inventive apparatus be configured such that (once assembled—i.e., during processing) the major mold sections 20 do not substantially move. As shown in FIGS. 1-3, and especially, FIG. 5, the major mold sections 20 preferably include passages 40 to allow gases to be pumped between the minor mold sections (as will be described in further detail hereinafter). On the other hand, as shown in FIGS. 10 and 11, by configuring the major and minor mold sections so that the size of the void created when the first pair of minor mold sections separate is limited, it is alternatively possible to utilize a configuration of the inventive apparatus having no air passages 40 in the major mold sections 20.

Figure 6:
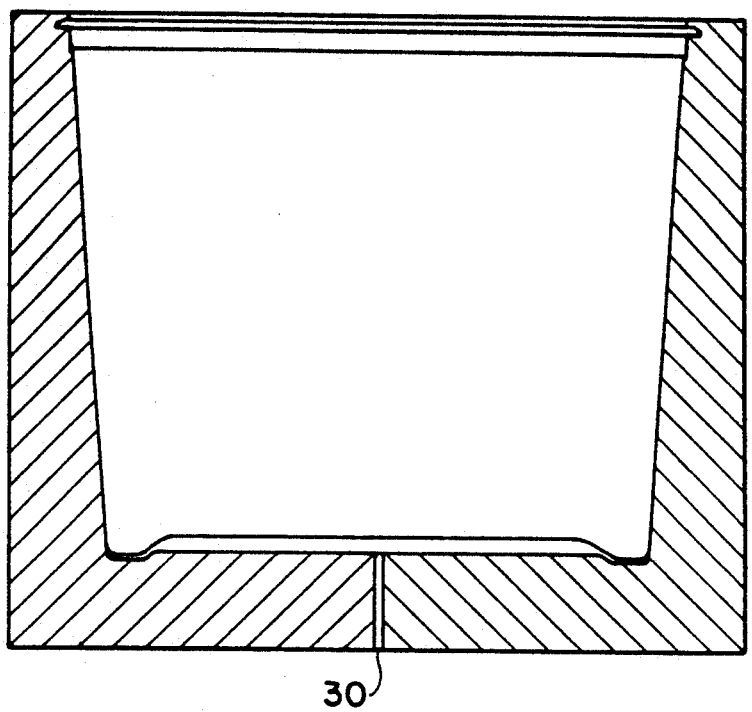
FIG. 6 is a sectional view of one mold half from a conventional apparatus, wherein the major mold sections has moved to form the thickened flange and wherein the tail of residual material has been severed from the container.

In the present invention, the goal of producing a container (e.g., flower pot) with a thickened (and strengthened) flange (preferentially including a turned-over outer/radial lip) is achieved by the movement of a plurality of minor mold components, and not by the movement of the major mold components 20. This distinction over the previously-known processes allows the present process to use much less energy (i.e., since much smaller and lighter mold components are being moved). Furthermore, as shown by comparing FIGS. 5 and 6, molding the desired thickened flange (with the ancillary turned over outer/radial lip) substantially without moving the major mold sections 20 allows the tail of material 30 formed between the major mold sections to remain attached to the containers and, once the container has been released by the major mold sections 20, facilitates removal of the containers 10 from the mold chamber and post-molding processing. As shown in FIG. 6, in previously-known processes, the tail 30 is usually detached from the container 10 by the movement of the major mold sections during flange formation.

The inventive apparatus comprises at least two pairs of minor mold sections 22—22 and 24—24. As shown in FIGS. 1-3 and 5, the minor mold sections are preferably disposed within the major mold sections 20 around the upper rim of each container (as is well known in the industry, open-topped containers are preferably formed two at a time, see, e.g., U.S. Pat. No. 5,026,268 to Lee—such a two container-per-cycle mold chamber is also preferably utilized in the present invention). The minor mold sections 22—22, 24—24 may be configured in a variety of ways (e.g., as a plurality of movable pieces), but preferably comprise continuous rings running all the way around the upper lips of the container 10.

The first pair of minor mold sections 22—22 are disposed the furthest away from the center of the container (i.e., the furthest to the left in FIGS. 1-3) and the second pair of minor mold sections 24—24 are disposed closer to the center of the container 10. Both pairs of minor mold sections 22—22 and 24—24 are movable in a substantially axial direction (i.e., by any suitable electromechanical, pneumatic and/or hydraulic means). As shown in FIGS. 1-3, each of the first pair of minor mold sections 22—22 preferably includes an indentation 23 therein whereby substantially two layers of thermoplastic material may be blown (and/or pulled by vacuum) into this indentation 23 for later compaction to form the thickened flange (27 in FIG. 4). Each of the first pair of minor mold sections 22—22 also preferably includes an elongated member 25 against which corresponding of the second pair of minor mold sections 24—24 may press during the compaction/bonding of the two layers of thermoplastic material, and hence, the formation of the thickened flange 27.

Figure 4:
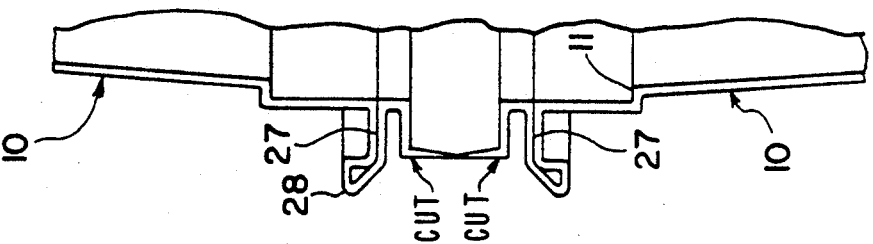
FIG. 4 is a fragmentary sectional view of the part formed by the inventive process and apparatus with desirable locations for separating the two containers indicated.

The exact configuration, positioning and movement of the first pair of minor mold sections 22—22 (i.e., of indentation 23 and elongated member 25) may of course vary widely depending upon the type of flange 27 desired. The configuration, positioning and movement of the second pair of minor mold sections 24—24 may also vary widely as required. In FIGS. 1-3, an angled indention 23 is shown within each of the pair of first minor mold sections 22—22 whereby a triangular rim of material 28 extending axially downwardly from the thickened flange 27 is formed by the first 22—22 and second 24—24 pairs of minor mold sections. As shown in FIG. 4, the triangular rim of material 28 may also be configured to be hollow, thereby saving material and minimizing costs.

(b) Process

In the inventive process, a suitable amount of moldable thermoplastic material is brought into the mold chamber by any suitable method (e.g., extrusion). Thereafter, the major mold sections 20 are closed around the parison of material (thereby capturing a tail of material 30 at the junction 21 of the major mold sections), thereby forming a sealed mold chamber. The thermoplastic material is expanded to fill the mold chamber (i.e., whereby the thermoplastic material comes in contact with the major and minor mold sections—by any suitable process, e.g., blow-molding, vacuum or a combination thereof—more preferably, by blow-molding). As shown in FIG. 1, at this initial stage of the process, the first pair of minor mold sections 22—22 are together (whereby the thermoplastic material is not blown into the passageways 40) and the second pair of minor mold sections 24—24 are extended outwardly (relative to the first pair of minor mold sections 22—22) to the extreme of their axial span (i.e., the space between the second pair of minor mold sections 24—24 is minimized). Once the minor/movable mold sections have been positioned in this fashion, the thermoplastic material 11 is brought into contact with the major and minor mold components as shown in FIG. 1.

In the second stage of the process, while at least the thermoplastic material 10 in the vicinity of the minor mold sections 22—22, 24—24 is still moldable, the first pair of minor mold sections 22—22 are separated. As shown in FIG. 2, this separation causes the two layers of thermoplastic material within the indentation 23 within each of the first pair of minor mold sections 22—22 to contact each other. The pressure exerted upon the two joined layers of material by the elongated members 25 of each of the first pair of minor mold sections 22—22 and the respective second minor mold sections 24—24 (combined with the residual heat of the material 11) substantially bonds the two layers of thermoplastic material together to form an integral thickened flange 27.

During this second step of the inventive process, as the two first minor mold sections 22—22 are spread apart, pressurized air may preferably be pumped into the void 41 between the first pair of the minor mold sections 22—22 through a passageway 40 between the major mold sections 20. Preferably, several passageways 40 are disposed around the circumference of the mold chamber (within the major mold sections 20—see, FIGS. 1-3 and 5) to equalize the pressure exerted upon the thermoplastic material 11 by the pressurized gas traveling through the passageways 40. The passageways 40 are preferably drilled, but may alternatively be formed in the major mold sections 20 by molding or any other suitable methodology. By pressurizing the void 41 (e.g., to about the same pressure as is being exerted by the blow-molding machinery upon the interior of the mold chamber, for example, about 60 psi), migration of the still-flowable thermoplastic material 11 is substantially prevented. This helps to prevent fouling of the first pair of minor mold sections 22—22 and, in turn, decreases process cycle time. Pressurizing the void 41 also helps to thin the residual material between the two containers 10 formed in the mold chamber (see, thinned material between the two CUT notations in FIG. 4) which, in turn, minimizes the amount of scrap created by the process (further reducing processing costs). Finally, pressurization of the void 41 (e.g., through pumping air through the passageways 40) may also be used to assist in separating the first pair of minor mold components 22—22 (further reducing process energy requirements).

As noted above, the bonding of the layers of thermoplastic material/creation of the thickened flange 27 within the indentation 23 of each of the first pair of minor mold sections 22—22 preferably occurs while the thermoplastic material is still moldable. If necessary, auxiliary heating of the first 22—22 and/or second 24—24 pairs of minor mold sections may be utilized to facilitate this bonding. Preferably, however, auxiliary heating will not be necessary. Furthermore, although it. is also possible to differentially heat some sections of the mold—see, e.g., U.S. Pat. No. 4,117,062 to Uhlig, column 2, lines 45-56, this is preferably also avoided in order to minimize machinery complexity and cost. Rather, the natural heat retention of the thermoplastic material 11 and speed of the first minor mold sections 22—22 will preferably be sufficient to ensure good bonding of the two layers of material forming the thickened flanges 27. Furthermore, it is expected (because of the relatively smaller size of the first 22—22 and second 24—24 pairs of minor mold sections, and perhaps, because of the use of less heat-conductive materials and the lack of internal liquid coolant channels) that the minor mold sections may retain somewhat more heat than the major mold sections 20 (especially after a few process cycles). This residual heat will further assist bonding of layers/flange formation.

In the third step of the process, after a suitable cooling time to allow setting of the container 10 (and especially, the thickened flange 27), the air pressures in the mold chamber and the void 41 are allowed to dissipate. As shown in FIG. 3, the second pair of minor mold sections 24—24 is thereafter retracted (i.e., moved axially apart—allowing the triangular rims 28 clearance thereover). Thereafter, the major mold sections 20 are opened (i.e., along the vertical centerline of the joined pair of containers) and the molded containers 10 are released from the mold chamber. After the joined pair of containers has been removed from the mold cavity, the first pair of minor mold sections 22—22 are brought together and the second pair of minor mold sections 24—24 are moved towards each other (i.e., as in FIG. 1) in preparation for the next processing cycle. As will be readily understood by those skilled in the blow-molding art, the specific amounts of time necessary to accomplish each portion of the inventive process, as well as the minimum total cycle time under the present invention will vary widely depending upon such factors as the particular type of material being molded, the size of the container being formed, the wall thickness and molding temperature of the container, etc. It is expected, however, that use of the inventive molding apparatus and procedure will not adversely affect cycle times.

Post-molding processing and handling of the containers 10 is facilitated by the preservation of the tail of material 30 (there may also be some residual thermoplastic material 11 on the end of the joined containers opposite to the tail 30—e.g., at the extruder outlet 33, which may further facilitate post-release handling). For example, the containers 10 will need to be conveyed to a trimming machine to separate the two containers molded by each process cycle. The tail of material 30 allows this transport to be accomplished without touching the thermoplastic material 11 of the containers 10 (which, although no longer moldable, may still be tacky and easy to mar or crush).

After being released from the mold chamber, the two containers 10 formed per process cycle are separated by an appropriate conventionally-known method. For example, the containers 10 may preferably be cut apart at the CUT points indicated in FIG. 4. As discussed above, because of the pressurization of void 41 and the stretching of the thermoplastic material connecting the two containers caused by the movement of the first pair of minor mold sections 22—22, the scrap material produced by the separating/trimming operation is minimized. More preferably, thermoplastic material is used in the present process, whereby the scrap material may be recycled. Additional finishing steps (e.g., detaching the tail of material and forming drainage holes in the containers) may also be accomplished as appropriate.

As shown in FIGS. 8 and 9, in a first alternate embodiment of the inventive molding apparatus and process, the first pair of minor mold sections 22—22 are configured to include passageways 42 therethrough (aligned with the passageways 40 disposed in the major mold elements 20). These passageways 42 allow gases (e.g., air) to be pumped into the mold chamber (through passageways 40 and 42) even when the first pair of minor mold elements 22—22 are in the closed or initial position (FIG. 8).

Under this alternate embodiment of the invention, compressed air may be introduced through passageway 42 just prior to the point in time when the blow-molded plastic material 11 is induced to conform to the mold cavity. The flow of cmpressed air through passageways 42 prevents the plastic material 11 from completely filling the annular void space between the elongated members 25 of the first pair of minor mold sections 22—22. The compressed air trapped in this area (i.e., void space 43) insulates the plastic material 11 overlying this void space 43 from the major and minor mold elements (thereby keeping the material warmer, and hence, more flowable than plastic material in direct contact with the major and minor mold elements).

In this alternate embodiment, as the first pair of minor mold elements 22—22 are moved axially apart (FIG. 9), the pressure of compressed air being pumped through passageway 42 is preferably slightly increased. This not only prevents plastic material 11 from entering the void space 41 created as the first pair of minor movable elements move apart, but can also create a type of "hinge effect", causing the plastic material being stretched to move radially inward (facilitating later trimming/container separation).

A second alternate embodiment of the inventive apparatus and process is shown in FIGS. 10 and 11. In this alternate embodiment, the major mold elements 20 are configured to minimize the size of the void 41 created as the first pair of minor mold sections 22—22 move axially apart. As shown in FIGS. 10 and 11, this configuration can make it possible to remove the expanded interstitial plastic material 11 (between the two containers—in void 41) without compressed air, and therefore, can make it possible to eliminate the passageways within both the first pair of minor mold elements 22 (i.e., 42) and the passageways within the major mold elements 20 (i.e., 40).

It will therefore be readily understood by those persons skilled in the art that the present invention is susceptible of a broad utility and application. Many embodiments and adaptations of the present invention other than those herein described, as well as many variations, modifications and equivalent arrangements will be apparent from or reasonably suggested by the present invention and the foregoing thereof, without departing from the substance or scope of the present invention. Accordingly, while the present invention has been described herein in detail in relation to its preferred embodiment, it is to be understood that this disclosure is only illustrative and exemplary of the present invention and is made merely for purposes of providing a full and enabling disclosure of the invention. The foregoing disclosure is not intended or to be construed to limit the present invention or otherwise to exclude any such other embodiments, adaptations, variations, modifications and equivalent arrangements, the present invention being limited only the claims appended hereto and the equivalents thereof.

I claim:

1. A molding apparatus for producing containers having thickened flanges from a parison of moldable material, said molding apparatus comprising:
   (a) means for enclosing said parison, said enclosing means comprising a plurality of major mold sections and a plurality of minor mold sections, said plurality of minor mold sections comprising at least two minor mold sections per container, said major and minor mold sections enclosing a mold chamber, said major mold sections being separable along the longitudinal axis of said containers, whereby when said major mold sections close around said parison, a tail of material will be captured between said major mold sections; and
   (b) means for expanding said parison of moldable material to contact said major and minor mold sections;
   said minor mold sections being movable to bring into contact and substantially fuse adjacent layers of said moldable material after said material has been brought into contact with said major and minor mold sections by said expanding means, said thickened flanges being formable without substantially moving said major mold sections and whereby said tail of material will not be detached from said containers during formation of said thickened flanges or release of said containers from said mold chamber.

2. The molding apparatus of claim 1 wherein said moldable material is thermoplastic.

3. The molding apparatus of claim 1 wherein said minor mold sections comprise two matched pairs of mold sections, whereby two identical containers may be produced simultaneously within said mold chamber.

4. The molding apparatus of claim 3 wherein said sets of minor mold sections are movable in an axial direction relative to said mold chamber, whereby the movement of said first pair of minor mold sections towards said second pair of minor mold sections causes adjacent layers of said expanded material to contact and substantially bond to each other.

5. The molding apparatus of claim 4 wherein each of said first pair of minor mold sections includes an indentation, said indentation extending radially outward from said second pair of minor mold sections, whereby when said thickened flange is formed by the relative moving together of said first and second pairs of minor mold sections some of said material will not contact said second pair of minor mold sections, but rather will form a lip of material extending angularly outward from said thickened flange.

6. The molding apparatus of claim 5 wherein said lip of material is triangular in cross-sectional shape and substantially hollow.

7. The molding apparatus of claim 1 wherein said minor mold sections are not identical in shape, whereby two differently-shaped containers may be produced simultaneously within said mold chamber.

8. The molding apparatus of claim 4 further comprising means to pump pressurized gas between said first pair of minor mold sections to substantially prevent said moldable material from expanding between said first pair of minor mold sections as said first pair of minor mold sections are separated.

9. The molding apparatus of claim 8 wherein said means for pumping pressurized gas between said first pair of minor mold sections comprises a plurality of passageways disposed in said major mold sections and a plurality of collinear passageways disposed in said first pair of minor mold sections whereby compressed air may be pumped between said first pair of minor mold sections, preventing said moldable material from covering said passageways in said first pair of minor mold sections.

10. The molding apparatus of claim 1 wherein said minor mold sections encircle substantially the entire circumference of said mold chamber and wherein said thickened flanges encircle substantially the entire circumference of said containers.

* * * * *